United States Patent [19]

Crouse et al.

[11] Patent Number: 4,613,915

[45] Date of Patent: Sep. 23, 1986

[54] TWIN TRACK VERTICAL MAGNETIC RECORDING SERVO CONTROL METHOD AND APPARATUS WITH OFFSET VOLTAGE COMPENSATION

[75] Inventors: William G. Crouse, Raleigh, N.C.; Earl A. Cunningham, Rochester, Minn.; Albert W. Vinal, Cary, N.C.

[73] Assignee: International Business Machines Corporation, Armonk, N.Y.

[21] Appl. No.: 787,875

[22] Filed: Oct. 16, 1985

[51] Int. Cl.⁴ .................................................. G11B 5/56
[52] U.S. Cl. ........................................ 360/77; 360/135
[58] Field of Search ...................... 360/75, 77, 78, 131, 360/134, 135

[56] References Cited

U.S. PATENT DOCUMENTS 4,559,570 12/1985 Schwartz .............................. 360/77

Primary Examiner—George G. Stellar
Attorney, Agent, or Firm—Edward H. Duffield

[57] ABSTRACT

This invention utilizes a sectored servo control having dual servo tracks recorded in the servo sector. In addition, the servo sector track portions have been recorded with two 180° flux reversals in each track's polarity. The tracks are generally recorded with DC recording current to set a uniform magnetic polarity. The current is switched twice, i.e., from positive and negative and back again or vice versa for each servo track within the servo sector interval. This permits separation of the sensor, amplifier and servo signal offset voltages from the main servo signal itself. Two samples of the servo control voltage are taken during the servo sector interval and the polarity reversal of the servo track is necessary to allow separation of the offset voltages from a variety of sources from the off track or servo error signal.

7 Claims, 21 Drawing Figures

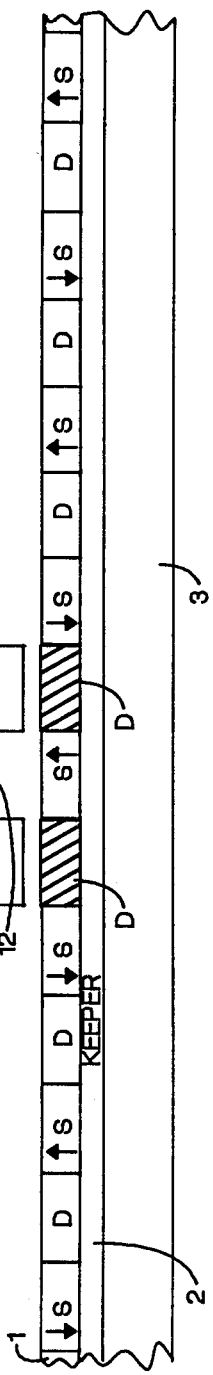
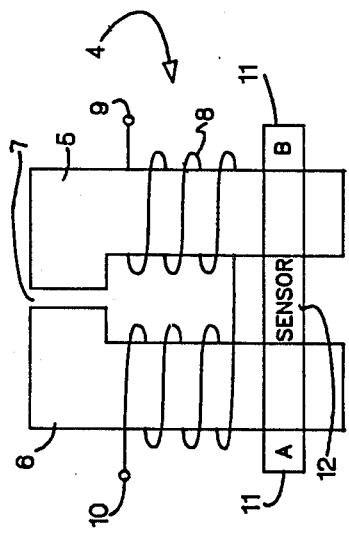
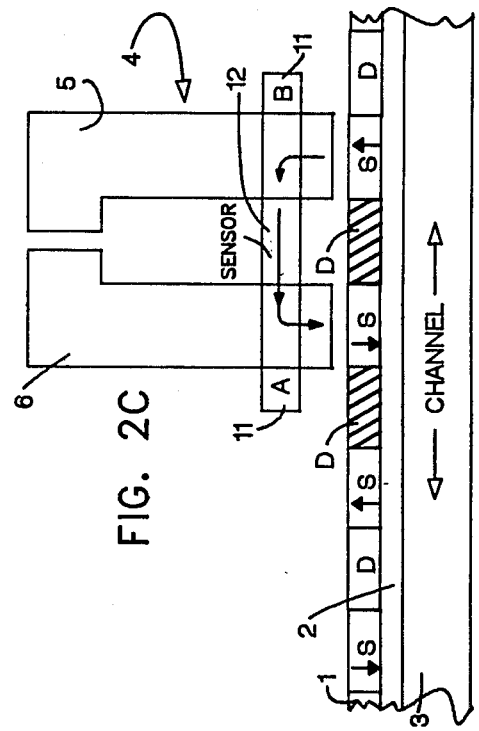
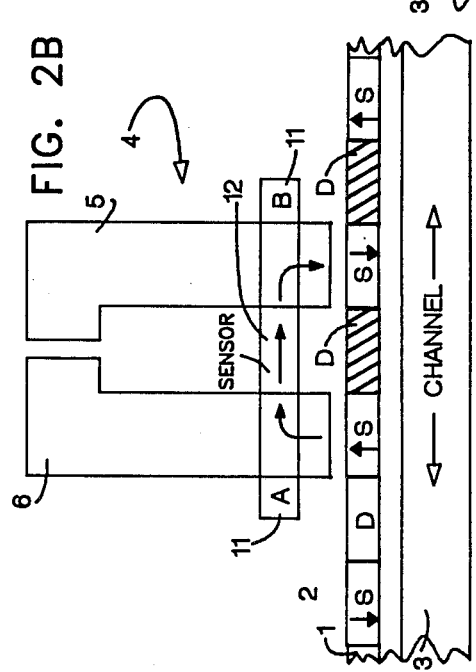
FIG. 2A
FIG. 2B
FIG. 2C

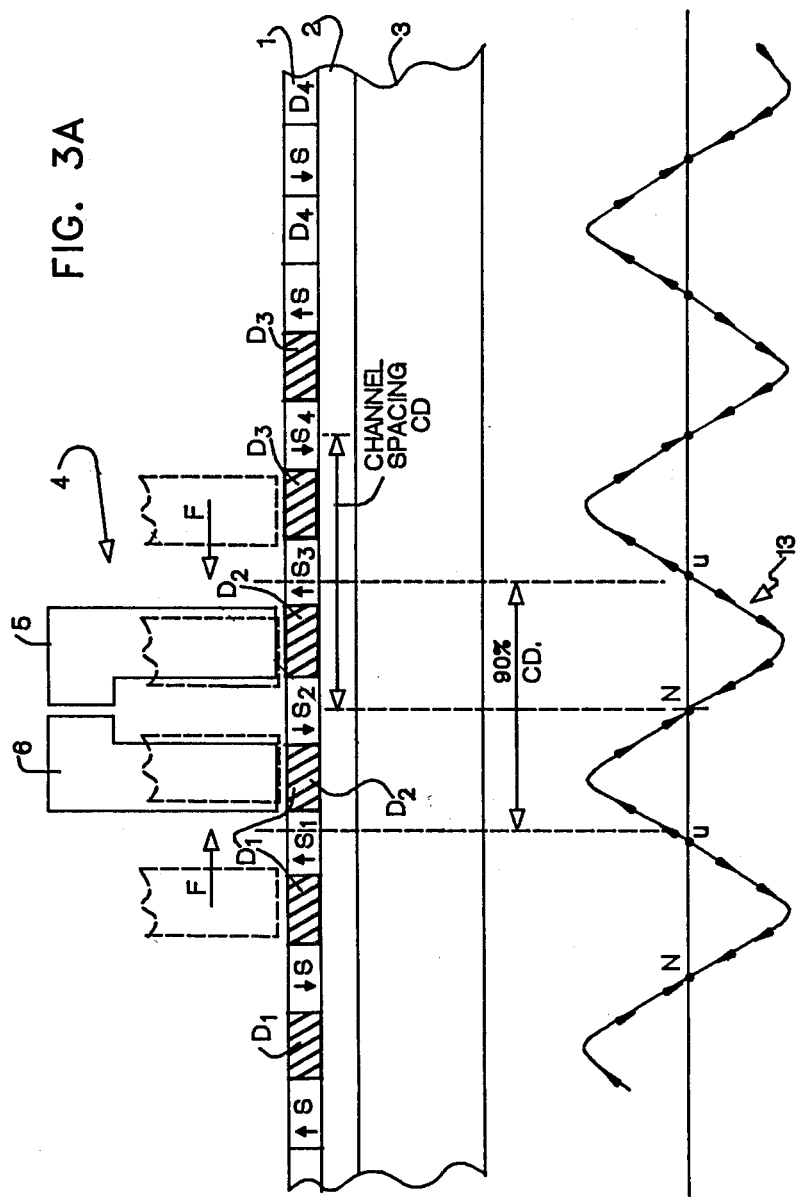

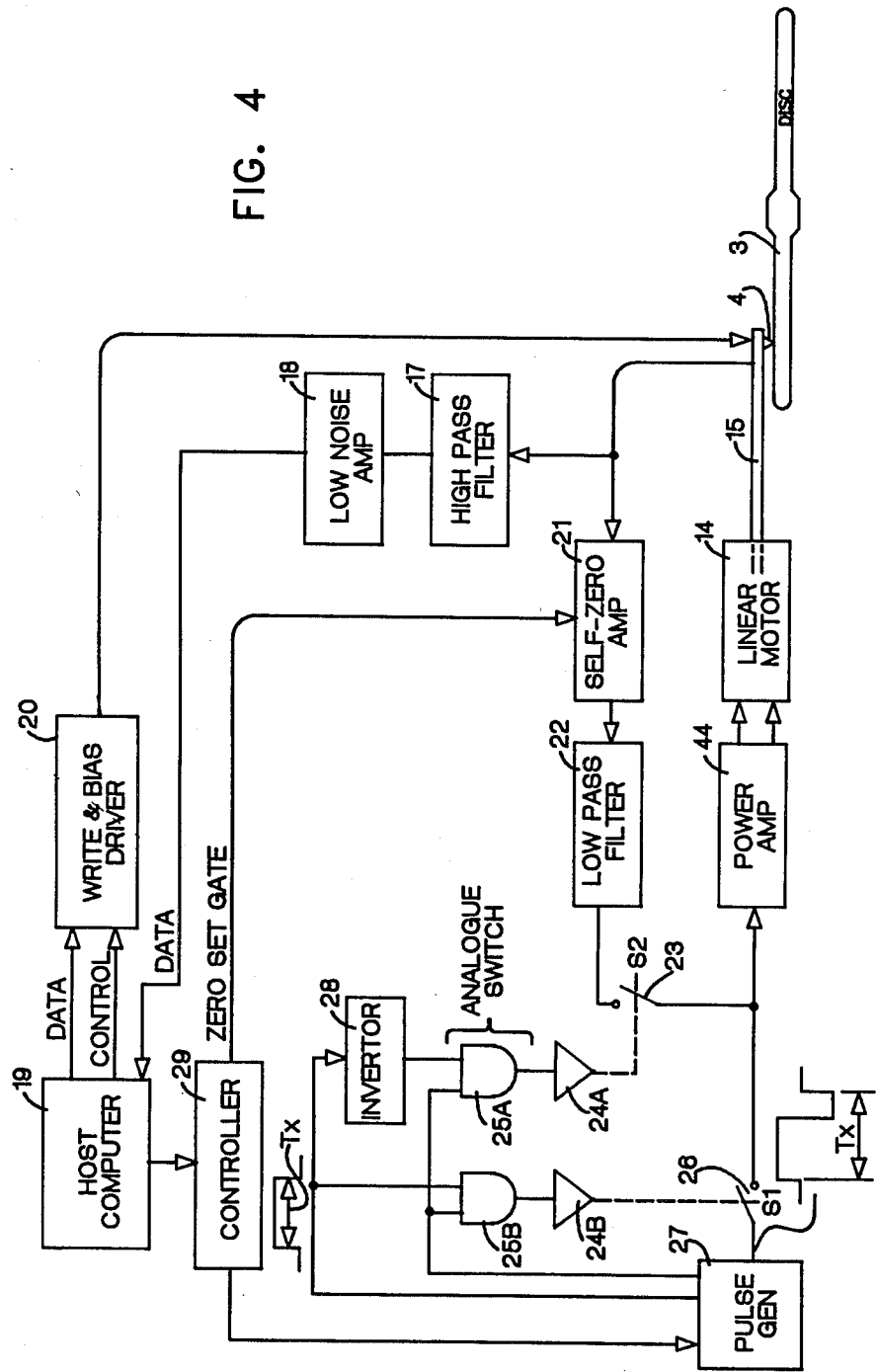

TWIN TRACK VERTICAL MAGNETIC RECORDING SERVO CONTROL METHOD AND APPARATUS WITH OFFSET VOLTAGE COMPENSATION

RELATED APPLICATIONS

This application is related to my co-pending commonly assigned application Ser. No. 787,876 and to the U.S. patents and other co-pending applications identified therein.

PRIOR ART

While a great deal of prior art exists in the field of servo control and magnetic recording for disks, drums, tapes and the like, the bulk of servo techniques either utilize the data signals themselves and analyze the signal read back from the medium for peak intensity or they utilize a separately recorded servo area where particular alternating patterns of magnetization are laid down that are easily detected and followed. The method which utilizes the data signal has been most commonly used but is inappropriate for high density recordings with very small track to track spacings since rather wide fluctuations in head position may occur before appropriate feedback signals can be utilized to move the head back on the center of the data track.

Prior servo devices that use a separate servo track typically record an alternating magnetic pattern that is incompatible with the data track since it produces a steady AC signal whose magnitude is more susceptible to accurate signal production for servo control. However, such signals are incompatible with data and cannot be recorded on the same surface or in the same areas of the magnetic medium as data is recorded. In such systems, no data can mix with the servo information because of the AC pattern of the servo tracks which would make it impossible to detect the data and/or to separate it from the servo signal. Therefore, such systems use a dedicated zone or surface of, for example, a disk where a disk type of magnetic medium is used for the servo track information. The servo tracks may be either continuous or discontinuous, i.e., in sectors or segments, but they are not contained in tracks adjacent to data tracks or interleaved with data tracks for the aforementioned reasons.

OBJECTS OF THE INVENTION

In view of the known shortcomings with the above-noted prior art approaches in servo control techniques for magnetic recording, it is an object of this invention to provide an improved servo control method and apparatus for twin track vertical magnetic recordings in which the servo control tracks can exist interleaved with data in a non-signal interfering manner.

Yet another object of this invention is to provide an improved servo control recording technique for twin track vertical magnetic recordings that produces essentially a DC servo signal output.

Yet another object of this invention is to provide an improved twin track vertical magnetic servo control apparatus in which the servo control tracks may be recorded in sectors, segments or on dedicated surfaces as may suit a given system of data writing and retrieval.

Yet another object of this invention is to provide an improved twin track vertical magnetic recording servo control apparatus in which the servo tracks may be interleaved with data tracks in protected sectors, zones or surfaces and in which the data track area therebetween can be utilized for system control data such as the information regarding the actual data tracks beginning and ending points, byte counts and the like.

The foregoing and still other objects that are not specifically enumerated are provided in a preferred embodiment of the invention as will be described in detail with reference to the drawing in which:

BRIEF DESCRIPTION OF THE DRAWINGS

FIGS. 2A through 2C illustrate schematically a twin track read/write magnetic head and sensor in position over a data track, left of the track and right of the track, respectively, in a data and servo system in accordance with the invention.

FIG. 3A illustrates the range of servo control in the present invention and shows the direction of the DC servo feedback derived from the servo tracks in the invention.

FIG. 4 schematically illustrates a servo control system incorporating the concepts of the invention and shows how the feedback signal can be low pass filtered out from the combined data and servo signal stream for application to the head position control circuits.

FIG. 7C is an enlarged schematic of a single data channel as recorded in FIGS. 7A and 7B on the surface of a disk type medium.

SUMMARY

Figure 1:
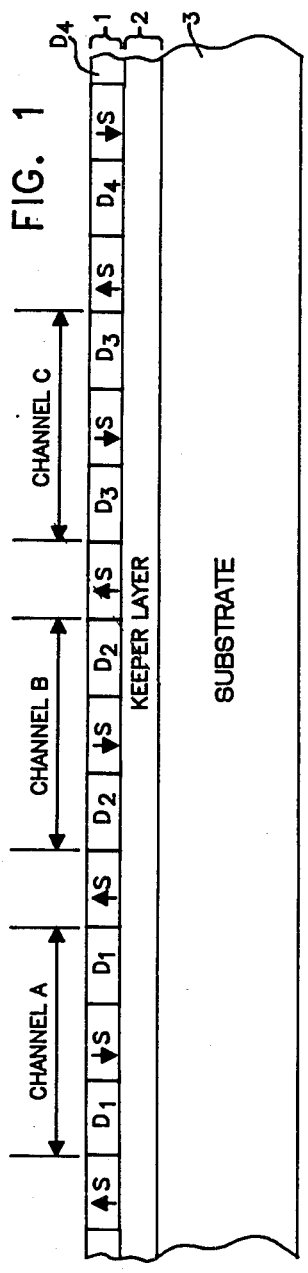
FIG. 1 illustrates a horizontal elevation section view of a vertical magnetic medium recorded with a servo and data pattern according to the present invention.

As shown in my above-mentioned co-pending patent application Ser. No. 787,876, it is possible by periodically sampling the DC servo error voltage at prescribed locations on the surface on the magnetic medium, to correct for position error and to simultaneously provide a zero actuator velocity at the end of each correction interval. Dividing a medium such as a disk into a plurality of pie-shaped sectors is the usual approach taken. In this invention, as with the above-noted prior application, each sector has three sub-sectors labeled S for servo, I for track information and D for data. However, unlike the above-noted application Ser. No. 787,876, the servo region labeled S in the present invention contains virgin DC twin track servo polarizations written during servo track initialization within the servo sub-sector. These twin tracks occupy two regions of equal length with opposite vertical magnetic polarizations within each servo sector. The first half of the servo sub-sector portion is written with one set of polarities, i.e., north and south for the two tracks and the second half of the servo sub-sector is written with the opposite polarities for each track. The servo tracks are continued as guard bands beyond the boundary of the servo sector but are used for noise suppression and data isolation, not for servo control. The polarity reversal within the servo sub-sector allows detection of offset signal voltage errors and subtraction of them from the overall servo signal. This is true because the off track servo error signal will reverse polarity due to the polarity reversal of the servo polarizations but the offset voltages included with the signal do not change polarity. Two samplings of the servo channel signal are performed, one in the first region of the servo control track sector and another in the second portion where the polarities have been reversed. Separate sample and hold circuits maintain the voltage from these selected samples for subtraction from one another in a differential amplifier so that the net result is an output signal equal to twice the servo voltage itself without any contribution from the offset components such as amplifier drift, magnetic sensor thermal effects, etc.

DETAILED SPECIFICATION

A word of introduction is offered first. Direct access magnetic storage device technology has evolved over many years. As the bit areal density recorded on magnetic mediums has continued to increase, the challenges facing development have increased. The current bit areal density is approximately $3 \times 10^6$ bits per square centimeter. Using such technologies, the most common method of reading magnetic transitions written either longitudinally or vertically on a magnetic medium has been inductive sensing of the time rate of flux change. Solid state magnetic field sensors have also seen many advances. The chief difference between an inductive, or time rate of flux change sensor, and a solid state sensor is that the inductive sensor responds to a change in magnetic flux while a solid state sensor responds to flux density, not to its rate of change. As the areal density of recorded data increases on a magnetic medium, the magnetic flux available for inductive sensing decreases. However, flux density close to the recording surface is essentially unaltered. It has been shown in my previously referenced paper that inductive sensor designs are practical solutions for data bit densities in the range of less than $2 \times 10^6$ bits per square centimeter but are unlikely solutions for future recording densities of more than $2 \times 10^7$ bits per square centimeter.

The increase in areal density also affects the method used for positioning and maintaining a read/write head adjacent to a specified track for both reading and writing functions. Servo mechanisms are the usual means provided for holding the head or heads on track. For such servos, DC signals whose polarity depends upon the tracking error are the most desired from the servo sensor standpoint. For reasons that will appear subsequently, it is also very desirable that the data reading head simultaneously function as a servo position sensor. Solid state sensors properly integrated in a read/write head structure have the inherent DC field capabilities needed for satisfying this criterion and are therefore superior to the inductive sensor for this choice. A suitable read head employing a solid state sensor is shown in my commonly assigned patent 4,485,419 mentioned above.

Vertical recording as opposed to lateral or longitudinal recording also uniquely satisfies the needs for providing a DC servo field as will appear shortly. The vertical twin track data recording method is shown in my U.S. Pat. No. 4,484,238 noted above.

Two basic techniques that have been exploited in the past for providing servo control data for disk file systems are now described. One method, termed the dedicated servo method, assigns one entire surface of a disk for servo tracking information while the other side of the disk is used for data. When multiple disks are used, the servo data is used to position one or more ganged heads. This ganged head technique limits the track density on the disks because mechanical variations both absolutely and incrementally affect the distance between servo tracking heads and the read/write heads which are mechanically coupled to each other in such a system. Thus, mechanical tolerances set a limit on practical track density in these systems.

A second servo control method utilizes an embedded servo data sector. The usual approach is to assign multiple pie-shaped sectors within a 360° circumference of each disk surface. The servo data is written once in these sectors and is protected from erasure or overwriting once it is so written. These sectors are only active when the read heads are within the servo space. Outside of the servo sectors, the control system must correct for position and velocity errors measured during the previous sector or, in the alternative, correction can be made in the servo sector based on measurements made within the sector or in a previous sector.

The dedicated servo technique noted above is well known in the art. Read only data, i.e., that which is written only once, such as channel identification and timing, cannot be included in the conventional dedicated servo magnetic medium surface. One reason is that the servo potential is derived from the pulse and phase information that cannot tolerate interference from data signals. The twin track vertical recording method described in my previously noted patent allows a coupled film magneto resistive sensor, or another solid state sensor such as shown in my previously mentioned patent, to read dedicated timing and channel data while simultaneously providing the DC components or lower frequency components for a center track null signal in a servo system. As will be seen shortly, if a read head of this type is located to the left of the center of a track, a DC signal of one polarity is sensed and coupled to the servo control motor to force the system back by seeking a null signal position. The opposite polarity DC signal will be sensed and coupled to the servo if the head moves to the right of the center track. The "on track" servo signal has a zero DC value. Several methods of achieving this result will be shown. Each is a different embodiment of this invention but operates in substantially the same fashion. Each pair of vertically recorded data tracks forming a given data channel will have associated with it two servo tracks. These may be interleaved with data tracks in one embodiment as shown in FIG. 1. When this occurs, these tracks serve as guard band tracks as well as will be described.

Turning to FIG. 1, a section of a magnetic medium such as a disk is illustrated as a horizontal elevation view with the disk mechanical substrate identified by the numeral 3. On the top surface a soft iron or magnetic keeper layer 2 is positioned. Only one surface is shown and the bottom surface of the disk would have similar coatings. Then, vertically orientable and polarizable magnetic medium 1 is deposited on the keeper layer 2. Within the magnetic vertically polarizable medium 1 a series of data tracks are written. The data tracks are seen in horizontal section as a radial cut through the disk is assumed in FIG. 1. Servo tracks are identified by the letter S with their magnetic polarization vectors shown by the small arrows up or down. Intervening data tracks are identified by the letter D. An individual data channel such as channel A comprises two data tracks, both labeled D1, whereas the next data channel such as channel B, comprises two data tracks, D2 and so forth. It will be observed that the servo tracks S are interleaved in this embodiment with the data tracks D and that the polarity of the servo tracks alternates from servo track to servo track. These are steady state polarizations written for a full 360° of disk rotation in this embodiment. They are written once with a DC current applied to a special writing head that will be described later. The servo tracks also act as guard bands to eliminate the sensing of unwanted spurious transitions that will exist in the recording surface beside the data tracks. Spurious or false data could occur in reading a data track due to slight misalignment intervals of the head and data track during previous writings. In conventional longitudinal recording systems for example, random data signals become noticeable at the sensor output terminals whenever a read head begins to slide off the recorded data channel. Unwanted random noise occurs each time the head slips partially off the track. The servo tracks S thus serve important service of isolating the individual data tracks and of providing the servo tracking signal as well.

The servo tracks could be located on the opposite side of the disk with the heads connected by a common yoke as will be discussed briefly below. The yoke is utilized to couple a bottom surface servo read head to a top surface data read/write head. Alternatively, a sectored system could be utilized in which these servo tracks act as guard bands or isolation means for the majority of the data portions but are interrupted by a brief segment or sector having servo control information and data. Each of these alternatives will also be discussed.

Figure 3C:
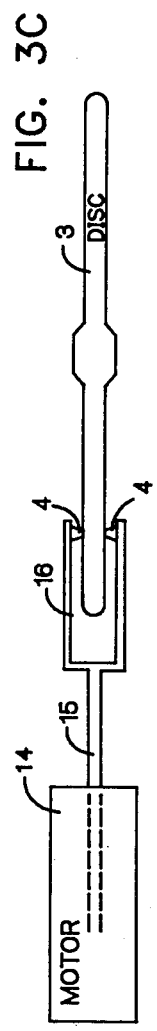
FIG. 3C illustrates a single servo control drive motor with ganged heads interfacing a magnetic disk medium in which one head writes and reads servo control and system data and the other is dedicated to the data read/write function for the main data sections.
Figure 3D:
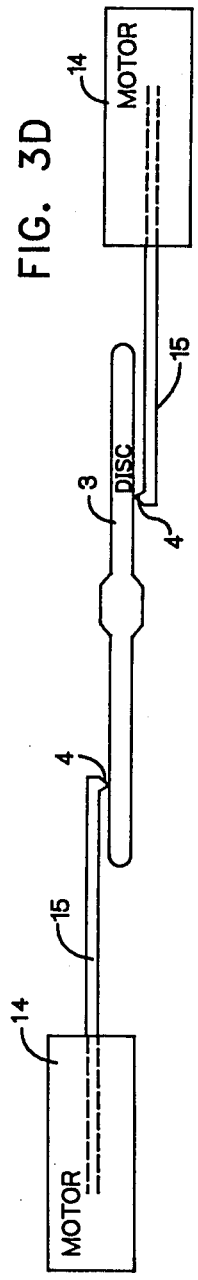
FIG. 3D illustrates an alternative embodiment to FIG. 3C in which dual servo control motors are utilized for the two surfaces on the disk.

Two basic system approaches for utilizing the twin track vertical recording technique are shown in FIG. 3C and 3D. The system shown in FIG. 3C utilizes a single linear motor 14 or actuator of suitable type coupled by an actuator arm 15 to a yoke 16 to simultaneously drive two read/write heads 4 back and forth radially across the surface of a disk 3. One head 4 is used for the top surface of the disk and another head 4 for the lower surface. Both heads are attached to a common mechanical yoke and actuating arm as shown. A linear positioning motor of any suitable type can be employed. Linear coil actuators are known as well as stepper motors and other similar systems adapted for this purpose. In such a system, the lower recording surface may be a dedicated control surface containing the servo tracks. Control data tracks may be interleaved with the servo tracks to contain the timing and sector information for the data tracks on the opposite surface.

Another system is shown in FIG. 3D which employs two linear motors 14, two actuating arms 15 and two read/write heads 4, each of which motors may be independently actuated. This approach requires an imbedded servo track which will appear with the data on each of the surfaces of the disk 3. The imbedded servo technique may have servo tracks which are divided into sectors or continuously recorded as will be discussed subsequently. The net system access time for a twin motor system such as shown in FIG. 3D is less than the average access time of the single motor system as shown in FIG. 3C.

Returning now to the discussion of a dedicated guard band and servo track system, FIGS. 1 and 2A through 2C will be reconsidered. In this system, the servo and/or guard band track functions may be met with the servo tracks themselves located on either surface of the recording medium and they may be continuous or segmented into sectors as will be described.

Returning to FIG. 1, a vertically polarizable, keepered, magnetic recording medium is shown in cross section along any portion of the radial cut of the disk. The servo tracks S are continuously written in a 360° arc in parallel concentric tracks with data tracks interleaved between them. It will be observed that any given pair of tracks D forming a data channel will be interleaved with three servo tracks in such a fashion that if the tracks are numbered sequentially beginning with the servo track on the left or the right and progressing to the servo track on the opposite side of the next data track, that data tracks will be in the even numbered positions and servo tracks will be in the odd numbered positions. As discussed briefly above, the magnetic medium consists of a vertically polarizable hard magnetic vertical recording layer 1 positioned on top of a soft magnetic keeper layer 2 physically bonded to a rigid substrate 3. Only a single medium and surface are shown, it being well known in the art that the opposite surface of the disk 3 can have similar coatings applied to it. FIGS. 1 through 2C all show a vertical recording medium divided into equal width tracks which are alternately labeled D and S. Tracks labeled D, as noted above, indicate data tracks, whereas tracks labeled S indicate servo tracks or guard band tracks or both.

In FIG. 2A a typical twin track read/write head 4 is shown adjacent to two data tracks forming a data channel. The read/write head 4 comprises two flux coupling legs 5 and 6, a back gap 7 in which may be located a magnetic sensor as shown in my aforementioned patent or in the alternative, a magnetic sensor 12 may bridge the two coupling members 5 and 6 and provide an output by leads 11 from contacts A and B as illustrated in FIG. 2A. A magnetic winding 8 provided with terminals 9 and 10 is utilized to provide writing flux when energized or to magnetically bias a sensor 12 if a magneto resistive sensor is employed. The details of such a read/write head and sensor system are not a part of this invention and are only alluded to briefly herein since numerous twin track structures for reading and writing may be envisioned.

Returning to FIG. 2A, a given pair of D tracks forms one data channel. As the disk 3 rotates and the head 4 maintains alignment with a dedicated D track pair, discrete oppositely poled vertically magnetized regions written in the adjacent D tracks will couple bit flux fields directly to the coupling legs 5 and 6 where they may be used to activate a sensor 12 as shown or another type of sensor located in the gap 7 as previously alluded to. Arbitrarily, binary 1 data regions may produce a positive sensor voltage and binary 0 data regions may produce a negative sensor voltage since, in the vertical magnetic recording method as shown in my previously mentioned patent, binary 1's and 0's are written in the form of opposite magnetization polarities in the medium. Alternatively, a change in polarity can be used to signify a 1 and maintenance of the same polarity from bit time to bit time can be used to indicate a 0 or vice versa. Such details of track data and track coding are similarly not a part of this invention, are well known in the art and will not be described further.

The amplified signal polarity may be strobed appropriately in the middle of each bit flux interval to extract the binary content of the data recorded in the data channel. In a dedicated servo surface, the control data need only be written once and will not be the ordinary information data which will actually be on the opposite surface of the disk utilizing a system such as shown in FIG. 3C. The control data written will be the information relative to the data tracks on the opposite surface, i.e., their track location, track identification, data count, starting and ending positions, etc. This control data need only be written once in the twin track D channels by passing a current through the writing coil 8 in FIG. 2A. The current direction is reversed to effect the writing of a 1 or a 0.

The tracks labeled S in FIG. 1 and FIGS. 2A through 2C represent the guard band or isolating band and servo tracks discussed briefly above. The direction of written magnetization in these tracks S is opposite in adjacent tracks and may be either up or down for the entire 360° of disk rotation. In FIG. 2A, the read head 4 is positioned nominally over a pair of data tracks D. For this head position, the bit flux data signal coupled from the medium is at its maximum for data and, as the coupling legs 5 and 6 are not positioned over the servo tracks, signal from the servo tracks is at a minimum.

FIG. 2B illustrates the read head 4 positioned directly over an adjoining pair of servo tracks which align with the coupling channels 5 and 6 with the head 4 at the left side of the data channel shown in FIG. 2A. In this position, the data signal coupled to the read head is a minimum since the head 4 is far off track to the left. The orientation of the magnetization vectors in the servo tracks as illustrated will produce a positive DC signal at the output terminals of the sensor 12. The output terminals 11 can provide the DC signal to a servo control system and cause the linear motor 14 such as shown in FIG. 3C to drive the read head 4 in a proper direction to return it to the position aligned with the data channel in FIG. 2A. FIG. 2C illustrates the similar situation with the exception that the read head 4 is positioned to the right over the pair of servo tracks therein. The orientation of magnetization within this pair of servo tracks is opposite to the case depicted in FIG. 2B. As a consequence, the polarity of the DC servo signal, which is at its maximum in this position, is opposite to that produced in FIG. 2B. In this case, the read head sensor 12 will produce a maximum negative DC signal at the output terminals 11. The negative DC signal can cause the linear head position motor 14 to drive the head 4 back to the data channel as shown in FIG. 2A.

Thus briefly described, it may be seen that the servo system can be designed to always drive to a position of maximum data signal and zero DC servo voltage. When the read head 4 is adjacent in part to a data track and to the servo tracks, both components of signal will appear in the output and the DC or lower frequency components will be the servo information, while the higher frequency AC components will be the data. These may be easily separated in a separating circuit as will be discussed briefly below. But a further word on the servo signal will be given first.

In FIG. 3A, an illustration of the DC component of the servo signal obtained from the head sensor 12 in response to the guard band/servo tracks S is shown as a function of the middle position of the read head 4, i.e., that in which it is directly aligned with the data tracks. The head position may vary to the left or right and the servo signal will vary accordingly. The null point in the DC servo outputs are labeled N in FIG. 3A where the DC signal's amplitude crosses the 0 voltage axis. Other cross over points are labeled U and appear at the left or right of the null positions N. Head drive at these positions would be unstable and the direction of drive unpredictable.

The dashed lines illustrate the possible stable excursions of the coupling legs 5 and 6 to the left or to the right where, moving as a pair, the legs 5 and 6 will have ventured as far as can be tolerated left or right of the data tracks D2. At least a portion of one of the legs 5 and 6 must be over at least a portion of least one of the data tracks in order to pick up any signal. Thus, the total approximate range of channel to channel interval with an effective seeking and return for the servo system is somewhat less than the full expanse from the center of a servo track to the left of the data channel to the center of the servo track to the right of a data channel. Ninety percent of such an excursion is the appropriate approximate maximum seeking range.

Figure 3B:
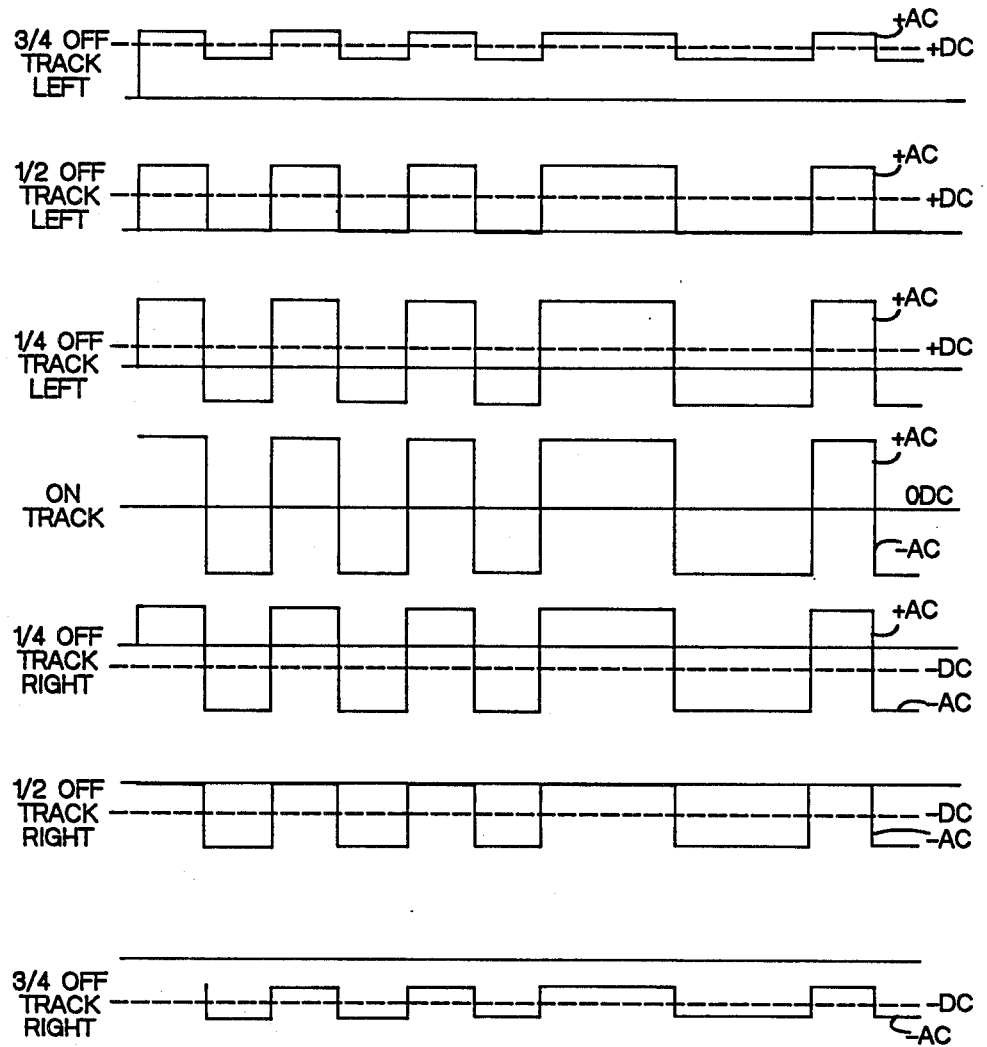
FIG. 3B illustrates the AC and DC components of the read/write head while following the data track precisely and as it moves left and right of the track according to the invention.

If the read head is positioned somewhere between the servo and data tracks, the sensor response signal will be as shown in FIG. 3B and will have both DC, or lower frequency servo components, and digital data AC components or higher frequency components. The frequency spectrum of servo data extends from purely DC on up to the servo roll off frequency of approximately a few thousand cycles per second. The servo roll off frequency will depend upon the maximum closed loop servo frequency response in a servo system and this, in turn, is based upon the design of the actuator and the mass of the system to be moved. The output spectrum signal also contains digital data having a frequency spectrum that begins well above the servo roll off frequency and extends to about twice the maximum bit rate. The upper bit rate depends upon the rotation rate of the disk and upon the linear bit density of the recorded data track information. A high pass filter may be placed between a read head amplifier and the data demodulator circuit to separate the data components of the spectrum for use in the computer system.

FIG. 4 schematically illustrates an operative simplified servo and data system. A disk 3 having a suitable medium as shown in the previous figures interfaces a read head 4 which must also be a writing head. Data to be written is supplied by the writing and bias driver 20 driven by a host computer 19 that supplies the data and control information to the driver 20. This may be written when the head 4 is appropriately positioned over a data track. Servo tracks are written in a different manner as will be described later below. Assuming the head 4 is somewhere within the active seeking range as previously depicted in FIG. 3A for a given data track, the output signal from the head 4 will be supplied simultaneously to a servo feedback amplifier 21 and to a high pass filter 17. The high pass filter 17 does not permit passage of the lower frequency or DC components that are servo control information. What passes through the filter 17 is supplied to a low noise, high frequency amplifier 18 and results as square wave amplified data signals to be interpreted by the host computer 19. The servo signal amplifier 21 is preferably a commercially available self zeroing amplifier as will be described in greater detail later. Its output is applied to a low pass filter which does not permit passage of the higher frequency or AC components above those to which the servo control system can respond. The operation of the control circuitry for the servo will be provided later.

To further describe the system operation, FIG. 4 may be depicted as a conventional "bang-bang" mode of servo control for positioning the read/write head 4 from one data channel to another. In this mode of operation, switch S1 identified as 26 will be closed and switch S2 identified as 23 will be opened by the controller 29 supplying signals to pulse generator 27 and from it to the analog switch control logic 25A and B and 24A and B. In the track changing mode of operation, switch 23 is closed and switch 26 is opened by a track search gate signal having a duration Tx as depicted in the figure. This timing gate signal serves to open the servo control loop entirely or partially by opening the analog switch 23. During the interval of time Tx, a pair of oppositely directed current pulses will be applied to the head position motor 14 through the power amplifier 44. The pulses are supplied by the pulse generator 27 under control of the controller 29. The first current pulse accelerates the linear motor 14 to move the head assembly in the desired direction. The second pulse, of opposite polarity, decelerates the motor and assembly to a nearly stable or stable location. The duration of the current pulses controls the overall acceleration and subsequent physical travel of the actuator arm 15 driven by motor 14. The duration of the current pulses may be controlled by a table look-up stored in the memory of the controller 29 which, under direction from the host computer 19, will select a set of pulse values to achieve a given movement from a first track to a second identifiable track. All of the possible track to track spans may be conveniently stored in the table for rapid look-up. The decelerating current pulse will be terminated when the head velocity has reached essentially 0. When this occurs, the servo loop may be again closed by closing switch 23 and opening switch 26 and allowing the closed loop system to establish the null or fine adjustment for the given new data channel positions.

While this discussion illustrates a simple "bang-bang" technique, many variations will of course be obvious to those of skill in the art. The purpose of this discussion has been to illustrate a simple and easily achieved operative system that utilizes the unique property of the DC servo control recording and to show how it may be simply stripped from the outgoing signal stream and applied in a closed loop or modified closed loop servo control system.

During the writing of data on the opposite surface of a disk, a dedicated control surface mode of operation can provide the servo control information along with the track identification, instructions and timing for read/write functions on one or more other data surfaces. Such a system would conform to that schematically illustrated in FIG. 3C, it being understood that a plurality of disks 3 and a number of yokes 16 might be physically coupled to a single actuator arm 15 and motor 14 under such circumstances. Where the guard band and servo channels are located on the same surface as the data, the data would include the track identification instructions and timing for positions within the very same data tracks. Such a system will be discussed in greater detail later.

In all of the systems, the writing of the guard band and/or servo channels is necessary. One procedure for providing a dedicated servo and control information is the generation of servo tracks on the original disk surface at a factory. This is done using a special piece of equipment called a servo writer well known to those of skill in the art. The alternative is to generate servo control data in each system by use of a special servo track head design and servo track writing control sequence. Self-contained servo writing techniques are particularly attractive if an interchangeable disk concept is envisioned. Since both data and servo information may appear on the same dedicated surface of a disk, and in which the data may be system data or control data, depending upon which surface of the disk is being written, it is a relatively simple task to incorporate a means of writing the guard band and/or servo tracks by adding a servo track writing structure to the magnetic read/write head design.

Figure 5:
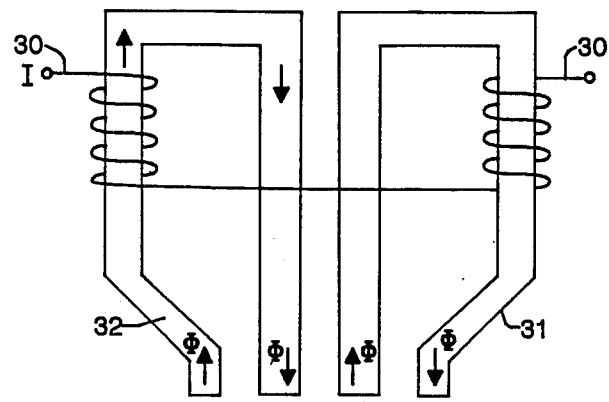
FIG. 5 illustrates schematically a servo track writing structure as incorporated in the invention.

FIG. 5 illustrates schematically a basic servo track writing structure. The coupling members 31 and 32 have an approximate U shape and are arranged so that pole tips fit the exact track to track dimension for a pair of servo tracks. A winding 30 may be supplied with current in an appropriate direction to generate the pairs of flux vectors as shown for writing simultaneously four continuously oppositely polarized tracks of servo information. When servo track writing is accomplished, for example by applying a unidirectional current to the write coil structure as shown for a full 360° of disk rotation, two read/write head structures as previously noted may be located up or downstream from the servo head structure to lock onto other servo tracks that have just been written. Such a configuration is shown in FIG. 6.

Figure 6:
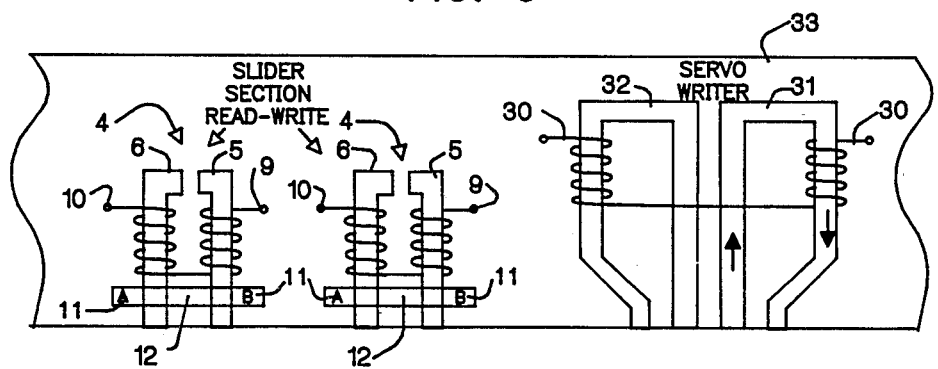
FIG. 6 illustrates two read/write heads and a servo writing structure as applied to a single movable arm or slider for application in a data writing and retrieval system as shown in FIG. 4.

In FIG. 6 a head slider 33 containing two read/write heads 4 such as shown earlier, and a servo writing head as shown in FIG. 5 are illustrated. These structures may be built using well known large scale integrated circuit technology as explained in my aforementioned copending patent application Ser. No. 584,364 or described in my aforementioned paper. Therefore, the slider section 33 may have laid out on it one or more read/write heads 4 and one or more servo writers with appropriate spacing between the pole tips of each of the structures to exactly match the desired track to track spacing. Thus, one of the read/write heads can be used to lock onto servo tracks that have been written and when this occurs, a DC current can again be applied to the servo writing structure to create another set of tracks at precisely the correct interval from the first set of servo tracks. Such a "boot strapped" servo writing technique may be continued until the entire useful dedicated disk surface is provided with concentric sets of DC guard band/servo data rings. At the end of this procedure, the intervening data channel areas will be unwritten and will be in their virgin state. The timing sector control and channel information for other surfaces of the disk or disk stack may now be written once, completing the information on a dedicated surface embodiment.

To begin the writing of servo channels, the system may move the head slider 33 to a fixed mechanical stop at the outer or inner useful radius of the disk where data tracks are not written. The center to center positions of the read heads on the slider 33 as shown in FIG. 6 is an even number of track intervals. When the first series of servo tracks has been written, the slider 33 can be moved under computer control to align one of the read/write heads with one of the pairs of servo tracks to provide an exact orientation of the servo writer portion in position to create another equally spaced group of servo tracks.

The system just described utilizes a dedicated surface magnetic disk recording system that takes good advantage of the unique properties that twin track vertical recording offer. Unlike single track longitudinal recording, DC field components are available and can be used directly as servo control information. A solid state sensor must be utilized to realize the benefits of the DC field component, however. Digital data may also be extracted from the dedicated surface to provide the read-only timing and channel information and to eliminate the need to consume costly space on the read/write disk surface that is controlled by the servo surface. However, the servo information can be sectored and laid out on the same surface as the data and utilized with the more conventional state of the art servo systems in which servo information is only provided in intervals with the tracking system making corrections between succeeding servo signal portions.

Such a system is depicted by the drawing FIG. 7A and will now be described in greater detail.

One problem exhibited in all servo systems is that there will be a hunting property in an analog feedback system that is continuously operative for a full 360° of disk rotation. With the servo track sandwiched between data tracks as previously shown, this also leads to some exposure to possible servo track erosion as a result of successive writing in the data track pairs. The dedicated servo surface, of course, eliminates this possibility since the data is written only once. However, where the data is contained in a read/write mode on the same surface as the servo tracks, servo track erosion and actuator hunting can be eliminated with a sampled servo approach rather than continuous analog control.

By periodically sampling a DC servo error control voltage at prescribed disk locations, it is possible to correct for positional errors and simultaneously achieve a zero actuator velocity at the end of each correction interval. Such a sampled servo control approach requires the dividing of a disk surface into conceptual pie-shaped sectors. Such an approach is illustrated in FIG. 7A.

The number of sectors used depends upon design factors such as the sampling rate of the servo system and the number of data bits that are desired per data sector. Referring to FIG. 7A, each sector has labeled three subsectors identified as S, I and D. The subsector regions labeled S constitute the servo polarization areas and contain virgin DC twin track servo tracks as previously described. These will be written during initial servo track construction. The polarity of these tracks is opposite to the remaining portion of the track outside of the sectors which act as a guard band. The reason for the reversal in polarity will be discussed subsequently. After initialization, no further writing is allowed in any track within the servo subsector portions S.

Regions labeled I are identification subsectors and contain a number of bytes of digital data recorded once for identifying track pairs, sectors, track addresses and the like. In this sector, the guard band or servo tracks are also written to shield the data from any spurious side track noise. This will also be described in greater detail below.

Figure 7A:
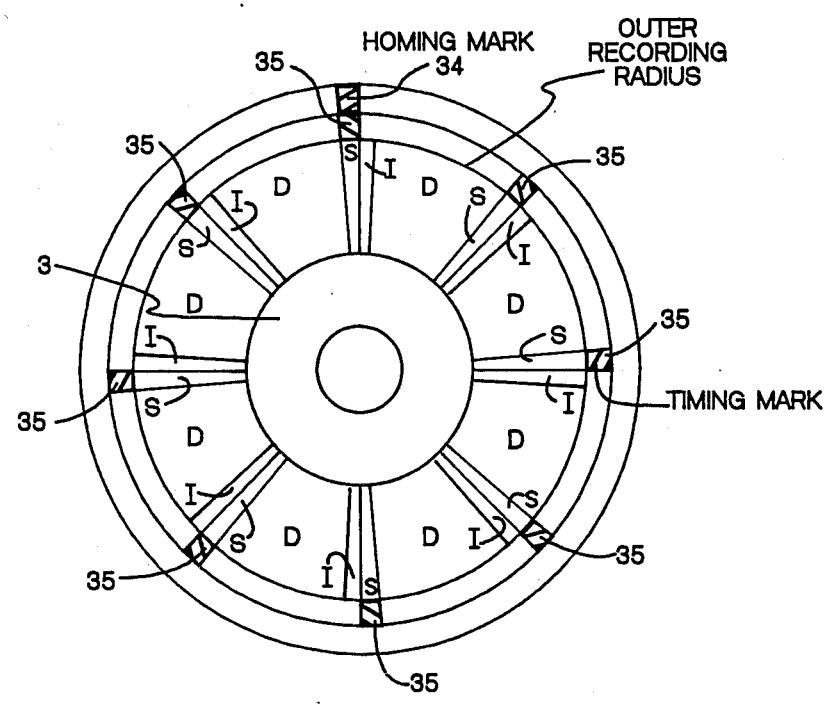
FIG. 7A illustrates in plan view a schematic layout of a disk type of magnetic recording with homing and timing marks to identify servo control sectors, channel information sectors and data sectors on the surface of the disk.

The regions labeled D in FIG. 7A are data subsectors and occupy a majority of the total area of the disk. DC guard band servo tracks written in these regions interleaved with the data tracks therein are generated during servo track initialization and are of opposite polarity to the servo track portions within segment S. These portions of guard band or servo track are used only for data track isolation and for zero offset amplifier references and noise suppression rather than for full closed loop servo control. In the alternative, they may actually be used for closed loop servo control if desired as will be described later. The writing of new data track pairs within the D sectors is permitted during writing intervals provided by the servo system. Whenever the servo track error voltage is below an arbitrarily fixed critical value in the preceding servo sector, data writing will be permitted in the subsequent data sector. This precaution can insure that new and old data track pairs will always accurately be positioned with respect to the DC servo tracks in the servo subsectors preceding them. By disallowing all writing operations in the servo subsectors after their initialization, the integrity of the servo tracks is guaranteed.

The servo control technique employed is a modified version of the "bang-bang" position control previously discussed. During the first half of each data subsector transition time, a voltage proportional to the head positional error developed from the preceding servo sector will be applied to the actuator to cause an accelerated motion to correct for the positional error. During the second half of the data subsector transition time, the same voltage with an opposite polarity will be applied to the linear position actuator to decelerate its motion. At the end of each data subsector, the positional error has been corrected and the actuator velocity is essentially 0. By proper choice of system parameters, the usual ping-ponging or hunting of servo control action can be eliminated.

Figure 8A:
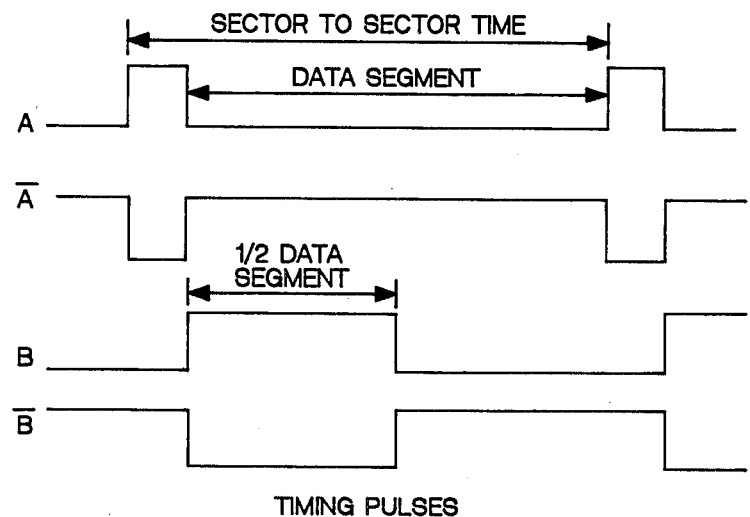
FIG. 8A is a timing chart showing the relationship between the servo sector time marks and the motor control switching points.
Figure 8B:
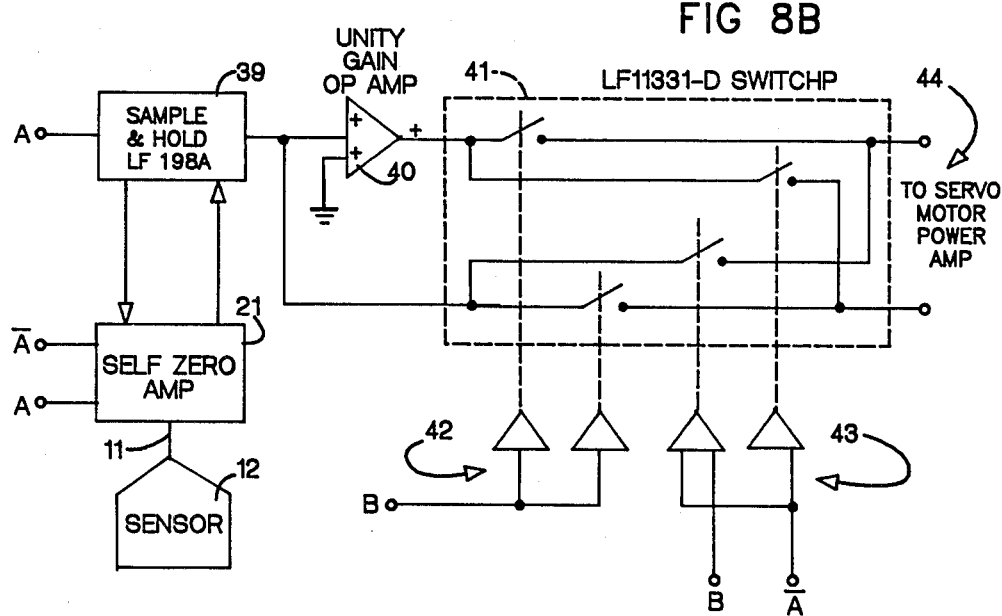
FIG. 8B is a schematic diagram of the motor control switching circuit as operated by the servo control apparatus.

FIG. 8B illustrates a system block diagram for such a closed loop sampled data servo controller. The close loop servo system is simple and consists of a sample and hold amplifier 39, a solid state sensor 12, which is part of the read/write head, and a self zeroing sense amplifier 21. A unity gain operational amplifier serves as an inverter to drive a servo motor input polarity switch 41 which may be a commercially available National Semiconductor LF11331-D switch, for example.

The overall system operates as follows:

Optical or magnetic timing marks are provided on the disk as shown in FIG. 7A by the homing mark 34 and by the sector timing marks 35. These are provided in the periphery of the disk at the disk manufacturing time. The timing marks occur to identify each servo subsector S. One servo subsector has two timing marks displaced in the radial direction to provide both a timing and a homing pulse or reference mark for determining the degree of disk rotation. Sensing of the timing marks can be optical, magnetic or electrical and can be used to generate electrical signal pulses to control the system operation. The critical control pulse times are those illustrated in FIG. 8A. Timing mark sensors are well-known in the art and are not further described herein.

Pulse A will occur each time that a timing mark sensor reads a servo subsector timing mark 35. Any off track servo error signal polarity and amplitude will be sampled during this servo sector timing interval. The sampled DC signal is held by the sample and hold amplifier 39 which may be a National Semiconductor LF-198A module for example. This is held for the entire duration of the following data subsector. A single shot servo sector gate is initiated at the end of each servo subsector, that is, generated by the trailing edge of each A pulse. The single shot servo gate is identified in FIG. 8A and has a duration set for approximately ½ of the time interval between two successive servo sector pulses or for ½ of the data segment duration as shown in FIG. 8A. At the end of the gate time B, the polarity of the amplified DC error signal coupled to the servo motor will be reversed by the polarity reversing switch 41 as shown in the timing diagram in FIG. 8A. By the time the next servo sector is sampled, the positional error should be quite small and the linear motor velocity should be essentially 0.

Returning to FIG. 7A, it will be observed that there are a plurality of data sectors labeled D. Each data sector has associated with it a servo sector S and an information sector I.

Figure 7B:
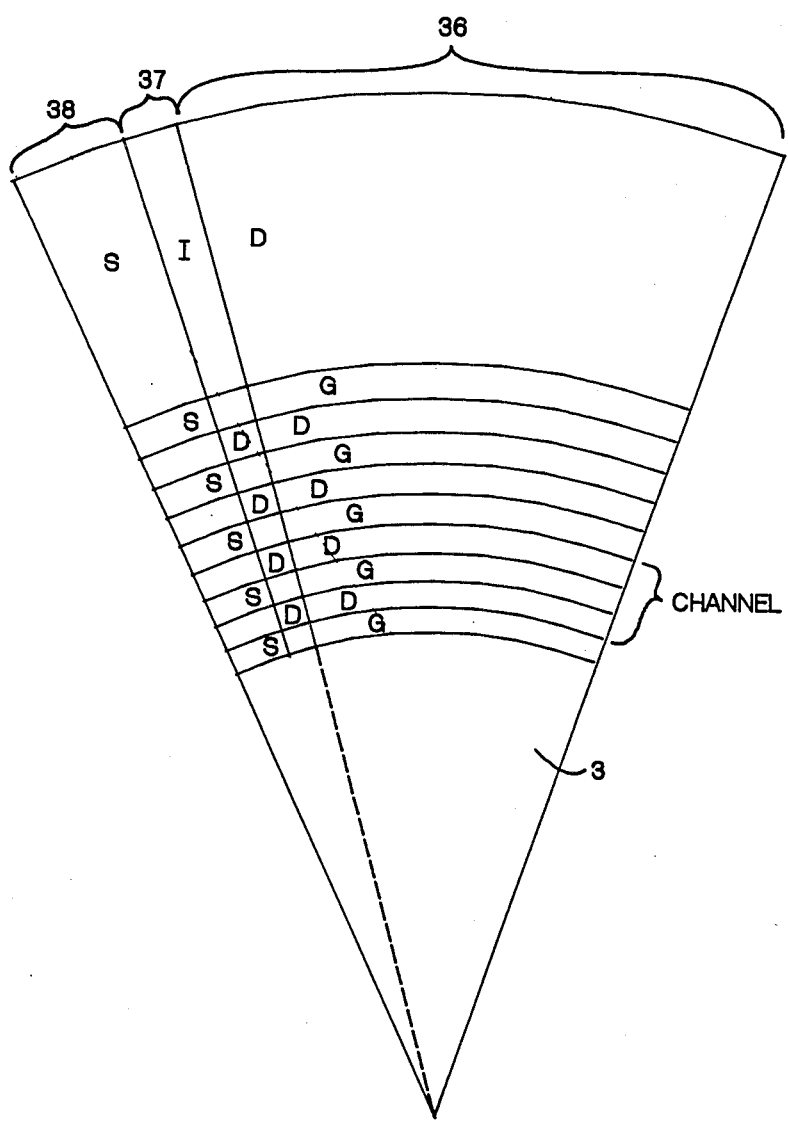
FIG. 7B is an enlarged view of a portion of FIG. 7A.

FIG. 7B illustrates an enlarged sector including a data, identification and servo component. The layout of guard bands labeled G within the data portion of the sector D and the data tracks D is shown. The guard bands continue into the area labeled I where the read-only data is written once to identify track position, address and the like as previously noted. The servo tracks are the continuation of the guard bands but are of opposite polarity for reasons that will be discussed now.

Turning to FIG. 7C, an enlarged view of the tracks through a given sector S, I and D are shown. The direction of motion of the medium is assumed to be from left to right as shown by the arrow in FIG. 7C. Servo information is written by DC polarity and the conventional magnetic vector notation of the circle with a dot or an X is utilized in the figure. The magnetic vectors are thus viewed as going into the plane of the paper with an X or exiting outward toward the viewer with a circle and a dot. A data channel containing variable binary information is shown by the series of paired magnetic vectors in the twin data tracks. Guard bands are interleaved between the data tracks and are DC recorded like servo tracks utilizing the same servo writing structure discussed previously. This is true during the data intervals which comprise the D and I section. It will be noted that these tracks are identical with the physical position of the servo tracks in the servo interval but are of opposite magnetic polarity to the servo tracks. The reason is subtle. The self-zeroing amplifier technique to be discussed below accounts for all of the static bias and superimposed off-track DC guard band field effects and spurious effects such as temperature on the sensor 12. The 0 offset DC balance occurs while the read/write head is aligned with data subsectors. To allow for detection of any DC off track head position error voltage, it is therefore necessary to provide a track polarity reversal in the servo subsectors of the disk. An example will be given.

Assume that a coupled film magneto resistive sensor such as that shown in my aforementioned paper is utilized and that the read/write head is located to the right of center of the data channel. The coupled film magneto resistive sensor's resistance can be balanced by a balance resistance Rb which will be equal to the resting bias resistance of the MR sensor minus a change in resistance $\Delta R$ brought about by the degree of off track coupling produced when the head is located to the right of the center of the channel. Equation 1 as set forth below shows this equivalence.

$$Rb = Ro - \Delta R \tag{1}$$

where $Ro$ = Rest biased resistance of MR sensor $\Delta R$ = Change in MR sensor resistance due to DC guard band or reversed DC servo field coupling to sensor.

Given that Rs is the sensor resistance of the coupled film magneto resistive sensor when the head is located in the servo subsector on the disk, Rs is equal to Ro, the rest biased resistance of the sensor, plus $\Delta R$ as shown by Equation 2.

$$Rs = Ro + \Delta R \tag{2}$$

Servo error signal is thus Rs−Rb or Equation 2 minus Equation 1. This is shown in Equation 3.

$$Rs - Rb = 2\Delta R \tag{3}$$

The result is $2\Delta R$ for the variation in resistance of the sensor as shown by Equation 3. To convert this to the sensor voltage that will actually be observed, one needs only multiply by the sensor current I as shown by Equation 4. Equation 4 thus gives the voltage produced at the output of the sensor off track to the right center of the channel. For the head located to the left center of the channel, it may be shown that the opposite result obtains due to the polarity of the servo tracks and that a $-2I\Delta R$ will be the center voltage signal. For the head centered on the track, the voltage difference will be 0. Thus the track polarity reversal in the servo subsectors may be used to generate the servo signal offset voltage that will have a magnitude of twice the track position error voltage and of the opposite sign necessary to correct for the track off position voltage as shown by Equation 4.

$$Vs = 2I\Delta R \tag{4}$$

A positive voltage in the assumed examples indicates that the head is right of center of channel and a negative voltage indicates that it is left of center of the channel.

Figure 9A:
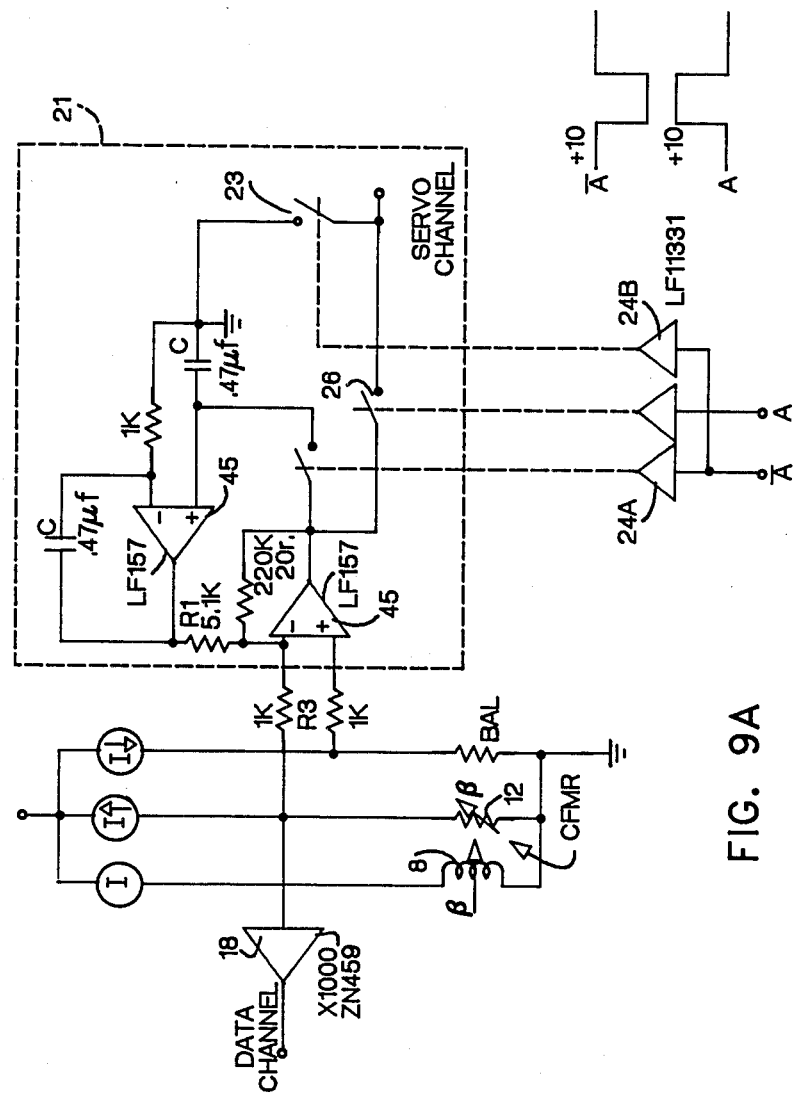
FIG. 9A is a schematic diagram of a preferred form of the servo and data amplifier network.
Figure 9B:
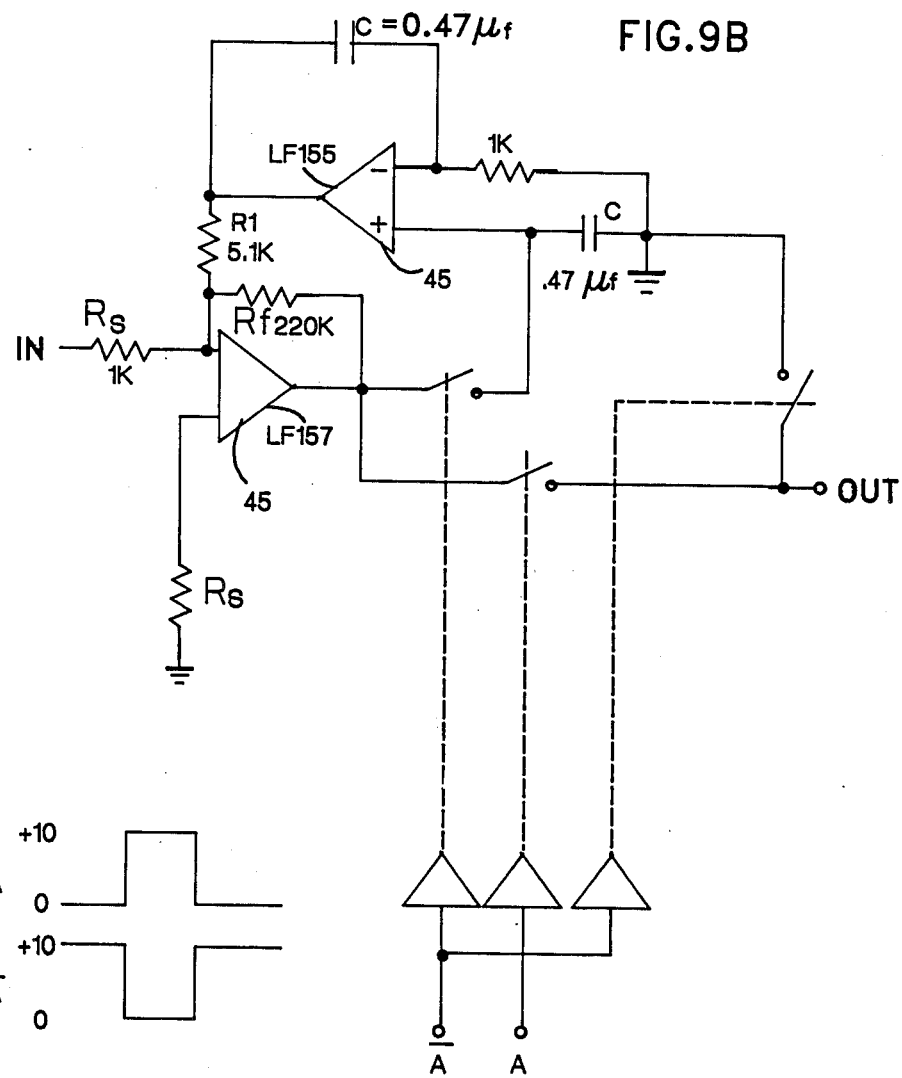
FIG. 9B is a typical schematic diagram of a single stage in the servo amplifier network.

The magnetic sensor 12 in the read head 4 is connected to two amplifiers as shown in FIG. 9A. One amplifier is the low noise wide band AC amplifier 18 that provides the data channel output as shown in FIG. 4. The output of this high pass amplifier is strobed to recover the binary content of the data signal in accordance with the bit flux sensing concept as described in my aforementioned patent. The other amplifier 21 is a self-zeroing DC amplifier having a nominal gain of 50,000. This amplifier consists of three self-zeroing stages of amplification shown in FIGS. 9A and 9B. The overall gain bandwidth is approximately 200 KHertz. The self-zeroing amplifier 21 would comprise three stages of amplification as shown by a single stage in FIG. 9B which would be strung together at their output port to the input port of the next, etc. Only a single stage is shown in FIG. 9A. A National Semiconductor LF157 self-zeroing amplifier may be employed as shown. The LF11331 switching module logic is shown as implementing the logic control 24A and 24B of FIG. 9A duplicates the functions as shown in FIG. 4B for these similarly numbered components. These components are contained within block 41 as shown in 8B with the individual switches used instead of their logical equivalent.

The overall operation samples the off track servo error signal polarity during the servo sector timing interval. Self-zeroing of the amplifiers is controlled to occur during the length of each data sector based upon the output received from the data channel and on any offsets from off track error, thermal noise, etc. However, the opposite could be applied just as easily with the off track servo error signal being developed during the data sector timing interval and with self-zeroing occurring during the servo sector time interval. It is more desirable, however, to provide off track servo error correction based upon the protected, i.e., non-changeable character of the servo sector zones rather than submit to the possible alteration of control information by continuous writing and over writing in the data interval section which might erode part of the servo band or guard band area.

It will be observed that what has been described are several preferred embodiments of the invention. There is one in which the servo/guard bands are continuous around 360° and are placed upon a dedicated surface, the intervening data channel areas of which are utilized for write once only information relative to positions of data tracks, addresses and timing information that relate to other data tracks on other surfaces. An alternative system places the continuously written servo and guard band tracks on the same surface as the data. In this system the track data information must be recorded in the same data tracks used for system data as well. A third preferred embodiment is the sectored or sampled data system in which the servo tracks act as guard band tracks in the region where they are adjacent to system data tracks and have a polarity reversal and act as zero offset servo track detection zones in the servo sector. This polarity reversal serves as a reference area or segment of the servo track and thus, a segmented servo track or sectored disk surface is envisioned in this embodiment. These sectored embodiments may also be on the same surface as the main data tracks or on a dedicated surface as will be readily apparent to those of skill in the art.

Improved Dual Segment Servo Control Method and Apparatus

As noted above, it is advantageous to provide a polarity reversal within the servo tracks where they are within a sectored servo system or layout. It has been found to be an improvement to provide a double reversal and to prevent any writing of data within the servo sector area after the initialization of the servo tracks therein. This permits maintenance of the integrity of the servo tracks and also allows detection and separation of the offset voltages produced by the amplifier sensor and any components of coupling from adjacent tracks in the servo sub-sectors.

The system operates as follows. As noted earlier, optical or magnetic timing marks 35, 36, may be provided in the outer radius of one of the surfaces of the disk 3. These timing marks are shown in FIG. 7A and occur during each servo sub-sector. Sensing of the timing marks generates electrical signal pulses used for control of the system's operation. Pulse A as shown in FIG. 12B occurs each time that a timing mark sensor reads a servo sub-sector timing mark. The off track servo error signal polarity and amplitude is sampled during this time interval. The sampled DC signal is held by a sample and hold circuit 45 or 46 for each servo sub-sector sample and these samples are maintained for the duration of the following data sub-sector. A single shot servo sector gate is initiated at the end of each servo sub-sector such as is generated by the leading edge in FIG. 12B. These are shown as the B and C timing pulses, respectively. The duration of each of these gates is approximately ½ the duration of the A pulse. The servo motor is controlled as was earlier described with relation to FIG. 3 by generating a pulse of approximately ½ the duration of the total data sector triggered from the following edge of the A pulse.

Figure 11:
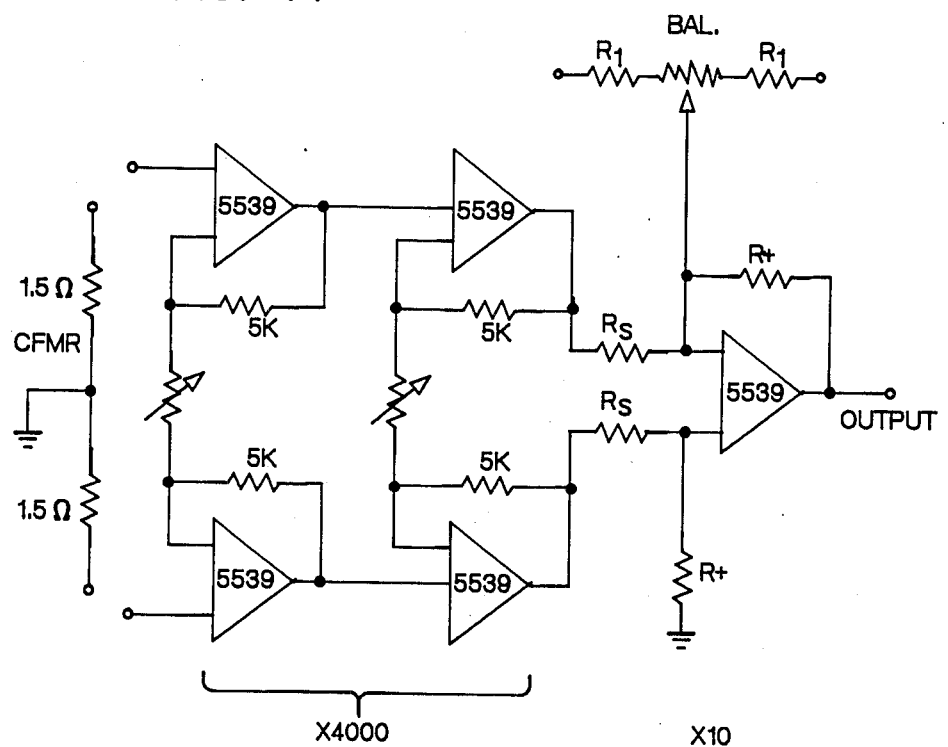
FIG. 11 illustrates a schematic diagram of an improved bipolar DC sensor signal amplifier.

The magnetic sensor 12 in the read-write head 4 is connected to the input of a differential wide band DC channel amplifier such as that shown in FIG. 11. The overall gain is approximately 40,000 and the DC output voltage component from this amplifier is presented at the output of point X in the servo tracking circuit in FIG. 12A. Its output is also supplied through reversed diodes 47 to charge the holding capacitors 48, one being charged on the negative phase and one on the positive phase. The capacitors 48 feed a resistive network to supply the output voltage at point X which is the amplified signal from the magnetic sensor 12. Individual sample and hold circuits 45 and 46 are gated by the gate pulses B and C in conjunction with the presence of the A pulse to sample and hold the levels from the capacitors 48 during the first half and the second half, respectively, of the servo sector. These are compared in the differential amplifier 49 to subtract the offset voltages resulting in an output to the final sample and hold circuit 50 of a voltage level twice that of the servo signal but without any contribution due to thermal offset in the sensor, the amplifier or the like. The output voltage at point X is compared in the comparator 51 against the amplified signal voltage coming from the channel amplifier during the data sector represented by the not A timing portion of FIG. 12B. The data is resolved by strobing the output of the comparator 51 at the mid points of the data pulse periods and would be provided by a suitable phase lock oscillator or the like maintained at the appropriate frequency by the incoming data stream.

Figure 12A:
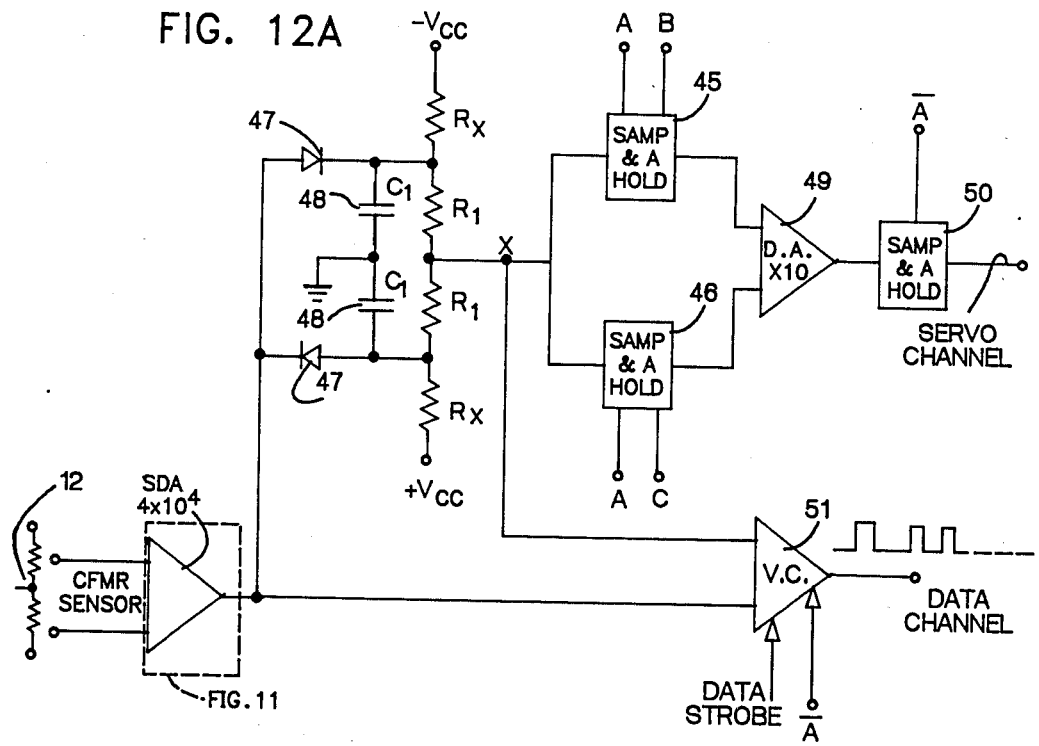
FIG. 12A illustrates a schematic diagram of an improved differential servo channel offset signal compensation circuit.
Figure 12B:
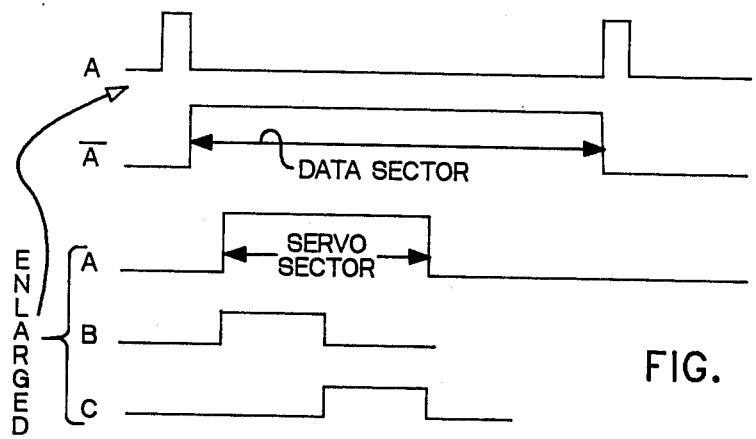
FIG. 12B illustrates a timing diagram for the control signals for FIG. 12A.

The DC output voltage component from the channel amplifier appearing at point X in FIG. 12A consists of several factors. It includes sensor thermal offset and resistive offset, amplifier thermal and impedance offset and signal voltage amplified from the DC servo or guard bands that may be present depending on the sector being read.

When the read head 4 is aligned with a pair of tracks in the data sector for example, the output voltage from the DC tracking circuit in FIG. 12A will be compared directly with the channel amplifier output in the voltage compare circuit 51. The output of this voltage compare circuit is the full bandwidth digital data stream representing the recorded bit flux in the data channel. The signal stream will be strobed at an appropriate position in time as mentioned to recover the binary content of the data signal.

Whenever the read head is within the servo sector, the circuit shown in FIG. 12A functions to recover the clean DC servo component. The amplitude and polarity of the DC servo output signal from the sample and hold circuit 50 depends on the position of the read-write head 4 with respect to the twin track servo channels in the servo sector. The DC servo signal appears at the output of the differential amplifier 49 and is held for the servo control system utilizing the bang-bang motor control technique described above.

Figure 10:
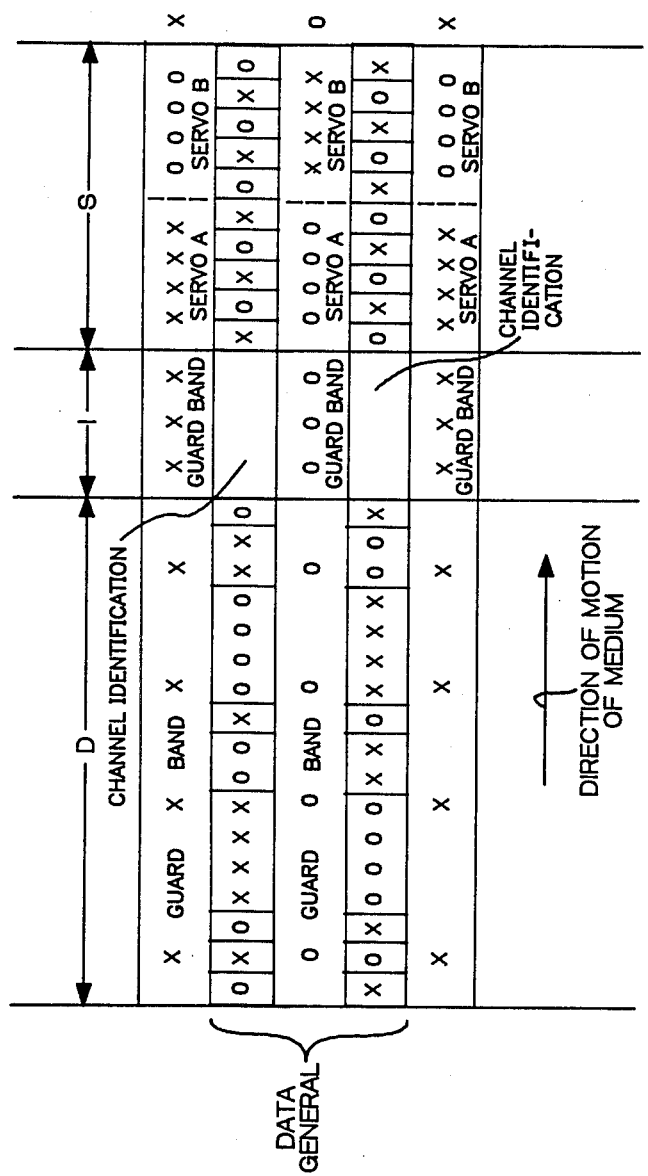
FIG. 10 illustrates an enlarged view similar to that in FIG. 7C of the servo, information and data segments and of the servo tracks recorded within the servo and information and data sector in particular.

In order to distinguish DC servo information from the amplifier and sensor DC offsets, it is necessary to reverse the DC servo track polarizations in two equal halves within the servo sub-sector as shown in FIG. 10. The DC tracking voltage $V_t$ presented at the output point X in the DC level tracking circuit of FIG. 12A during the first half of the servo sector consists of the sum of all contributing DC offset voltages $V_{of}$ together with the amplified servo error voltage $V_s$. This composite voltage is expressed in equation (1) below as the tracking voltage during servo sub-sector A, $V_{ta}$. It will be observed that $$V_{ta} = V_{of} \pm V_s. \qquad \text{Eq. (5)}$$

as shown in Eq. (5). During the second half, the B half of the servo sector, the same composite offset voltage $V_{of}$ is added to the opposite polarity DC servo voltage $V_s$ and will be sampled and held during this servo sub-sector. The voltage is expressed as:

$$V_{tb} = V_{of} \mp V_s \qquad \text{Eq. (6)}$$

Both the A and B sample and hold circuit 45 and 46 associated with the level tracking circuit in FIG. 12A are directly coupled to a balanced unity gain differential amplifier 49. The output of the differential amplifier is the difference between $V_{ta}$ and $V_{tb}$. Taking the differences shown in Eq. (7), $$V_{ta} - V_{tb} = \pm 2V_s \qquad \text{Eq. (7)}$$

it will be observed that the voltage offset $V_o$ is cancelled at the output of the servo tracking channel in FIG. 12A and the DC servo signal $V_s$ is doubled. The output of the sample and hold circuit 50 is directly coupled to the switching unit 41 previously described to change the polarity of the servo error signal coupled to the input terminals of the servo motor control power amplifier. Polarity reversal produced by the switch 41 occurs approximately half way between two adjacent servo sub-sector pulses using the above-described bang-bang servo control technique as previously noted.

The DC voltage tracking circuit in FIG. 12A has been illustrated in its simplest form and consists of simple passive elements such as resistors, diodes and capacitors. The circuit may, of course, be constructed using active components without altering the basic function or purpose of the voltage tracking technique.

It may thus be seen that the preferred embodiments all comprise at least two servo tracks written in association with each data track and that a reversal or reference segment thereof may or may not be incorporated as desired. Therefore, numerous variations in layout and structure are possible without departing from the spirit and scope of this invention, wherefor what is described in the claims which follow is intended by way of description alone and not by way of limitation.

What is claimed is:

1. Vertical magnetic recording head position servo control apparatus, comprising:
    a magnetic recording medium having at least one data track recorded thereon; and,
    for each said data track, two parallely spaced apart servo tracks of opposite magnetic polarization to one another recorded on said medium; and
    said servo tracks contain at least one segment each that have a full reversal and restoration of magnetic polarization within approximately equal halves of each said segment.

2. A vertical magnetic servo track recording method, comprising a step of:
    writing two oppositely magnetically polarized servo tracks parallel to each data track on a vertically polarizable magnetic medium; and,
    reversing and restoring the magnetic polarity of polarization within each said servo track.

3. Vertically polarizable magnetic medium recording head position servo control apparatus, comprising:
    a plurality of parallel, vertically polarized recorded servo tracks in said magnetic medium, the vertical magnetic polarization of which tracks alternates from track to track; and
    the vertical magnetic polarization of which tracks is reversed within at least a segment of each track relative to the remaining portion of each said track and is then restored within said segment.

4. Apparatus as described in claim 1 or claim 3 wherein:
    a pair of said servo tracks is located on a first surface of a two-surfaced magnetic recording medium and said data track is located on a second surface of said medium.

5. Apparatus as described in claim 4, wherein:
    a plurality of said recording mediums are aligned on a common axis and said first surface is on one of said mediums and said data track is on any of the remaining surfaces of said plurality of mediums.

6. Apparatus as described in claim 4, wherein:
    said servo tracks have interleaved data between a data track for recording system control data relative to said data tracks on said second surface of said medium.

7. Apparatus as described in claim 5, wherein:
    said servo tracks have interleaved therebetween a data track for recording system control data relative to said data track on any of the remaining surfaces of said plurality of mediums.

* * * * *